United States Patent
Reinhardt

(10) Patent No.: US 7,721,262 B2
(45) Date of Patent: May 18, 2010

(54) SYSTEM, METHODS AND APPARATUS FOR MARKUP LANGUAGE DEBUGGING

(75) Inventor: Holger Reinhardt, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 1142 days.

(21) Appl. No.: 11/346,135

(22) Filed: Feb. 2, 2006

(65) Prior Publication Data

US 2006/0259898 A1  Nov. 16, 2006

Related U.S. Application Data

(60) Provisional application No. 60/649,189, filed on Feb. 2, 2005.

(51) Int. Cl.
*G06F 9/44* (2006.01)

(52) U.S. Cl. ..................................... 717/124

(58) Field of Classification Search .................. 717/124
See application file for complete search history.

(56) References Cited

U.S. PATENT DOCUMENTS

| | | | |
|---|---|---|---|
| 6,748,583 B2* | 6/2004 | Aizenbud-Reshef et al. | 717/127 |
| 6,817,010 B2* | 11/2004 | Aizenbud-Reshef et al. | 717/127 |
| 7,251,809 B2* | 7/2007 | Barclay et al. | 717/128 |
| 2002/0120918 A1* | 8/2002 | Aizenbud-Reshef et al. | 717/127 |
| 2002/0120919 A1* | 8/2002 | Aizenbud-Reshef et al. | 717/127 |
| 2003/0056198 A1* | 3/2003 | Al-Azzawe et al. | 717/127 |
| 2003/0070030 A1* | 4/2003 | Smith et al. | 710/309 |
| 2003/0196192 A1* | 10/2003 | Barclay et al. | 717/128 |
| 2004/0199526 A1* | 10/2004 | Nishikawa et al. | 707/100 |
| 2006/0031466 A1* | 2/2006 | Kovach | 709/224 |
| 2006/0265689 A1* | 11/2006 | Kuznetsov et al. | 717/117 |

\* cited by examiner

*Primary Examiner*—Wei Y Zhen
*Assistant Examiner*—Yuntao Guo
(74) *Attorney, Agent, or Firm*—Chapin IP Law, LLC

(57) ABSTRACT

A system, apparatus and method process data by identifying a processing pipeline defining a series of markup language processing steps. The system inserts at least one debugging step into the processing pipeline. The debugging step(s) define processing to collect debug data associated with application of the markup language processing steps to markup language data to be processed by the processing pipeline. The system executes the series of markup language processing steps, including the debugging step(s), upon input markup language data as a transaction. Execution of the debugging step(s) captures the debug data for at least one of the series of markup language processing steps in the processing pipeline. The debug data allows analysis of operation of the markup language processing steps of the processing pipeline on the input markup language data.

23 Claims, 6 Drawing Sheets

SYSTEM, METHODS AND APPARATUS FOR MARKUP LANGUAGE DEBUGGING

CROSS REFERENCE TO RELATED APPLICATIONS

This application claims the benefit of the filing date of U.S. Provisional patent application No. 60/649,189, entitled "MULTISTEP PROBE DEBUGGER" filed Feb. 2, 2005, that shares co-inventorship and co-pendancy herewith. The entire teachings, figures and contents of this pending Provisional application are hereby incorporated by reference herein.

BACKGROUND OF THE INVENTION

Computer systems and computerized devices operate software programs that exchange data in a variety of different data formats. As an example, conventional computer programs can format messages and data in a markup language data format such as the eXtensible Markup Language (XML) data format that encodes data in a platform independent manner to allow different computer systems to share the XML encoded data. The software industry commonly refers to data encoded in the XML data format as an XML document. Software developers have created many different programs that are capable of performing a various processing operations on XML documents. XML is a text-based language that requires significant processing resources to encode and decode and otherwise process the data since XML is not in a native machine or processor format.

As an example of conventional XML processing, in a conventional web services architecture, a server computer system can provide access to processing functionality using a web services interface that is defined in a machine-readable interface description, such as Web Services Description Language (WSDL). A particular service expressed or described in WSDL can provide some predefined and specific processing functionality. Other computer systems (e.g., other servers) that want to access web service functionality can discover and invoke the web service offered by the web services server by submitting requests for the service to the web services server using XML data encoded in a remote method invocation protocol such as the Simple Object Access Protocol (SOAP). A requesting computer system can transfer XML/SOAP requests to the web services server providing the web service over HTTP (or over secure HTTP, known as HTTPS). When a server receives an invocation of a web service via an XML message or stream of messages encoded using SOAP/HTTP, the web services server decodes and processes the XML encoded data, performs the web service processing (i.e., the application processing) on the decoded data, and can formulate an XML/SOAP/HTTP response. The server then returns the response to the requesting computer system (i.e., a client or another server) in XML format via HTTP. The XML/SOAP/HTTP web services computing paradigm thus allows distributed computing servers to share processing functionality with other computers, such as other servers and/or clients, using XML encoded data.

Conventional XML processing technologies embedded within a web server allow the web server to interpret and process the XML-encoded data in a variety of ways. Several conventional XML technologies allow a software application to access (e.g., extract) XML-encoded data for application processing purposes. As an example, a server can use XML software processing technologies such as the Document Object Model (DOM) or Simple Application programming interface for XML (SAX) to parse XML documents to gain access to the encoded data. In addition, other XML-related technologies such as XPath and the eXtensible Stylesheet Transformation Language (XSLT) allow a developer of an XML-aware software application to define transformations of XML encoded data from one data format to another. Extensible Stylesheet Transformations (XSLT) is a language originally intended for converting, or transforming, documents written in XML into other formats, including HTML and other XML vocabularies. XSLT uses an XSL document to transform an XML document from one format to another. A schema is a description in a meta-language specifying the acceptable syntax or structure of an XML document. A schema document is used to validate an XML document and guarantee that its syntax is correct. Several schema languages exist. A filter is one or more XPath expressions (which may optionally be contained in an XSLT document or other control structure) used to extract data from an XML document. This data can be used to produce a decision on the acceptability of the input XML document based on an arbitrary set of criteria as expressed in the query expressions. A filter verifies the input document based on semantic or other content (transformed or not transformed) not typically related to syntax, and so differs from a schema validation in this way.

An XSLT document can be used to transform an XML document, and also to schema validate the XML document at the same time using a schema specified in the XML document (or other out-of-band mechanism). As an example, a developer that creates an XML-aware application (e.g., for use on a web services server platform) can create an XSLT transformation to convert XML encoded data to HTML encoded data. A web server process that receives XML encoded data can apply such an XSLT transformation to the XML-encoded data to convert this data, for example, from XML to HTML and the server can return this data to the client thus allowing the client browser to render the XML-encoded data as HTML within a web browser.

If data security is a concern when performing transactions of XML encoded data between computer systems, conventional standards and common practices have emerged to allow a web server to use some of the above XML processing tools (e.g., DOM, SAX, etc.) to perform XML processing such as digital signature validation, encryption, and decryption upon XML encoded data. Other data messages, such as email messages, can be encoded in XML and software developers have created XML-based email message processing applications to parse and process XML encoded email. Generally then, there are a variety of different processing operations that software programs can apply to XML encoded data.

BRIEF SUMMARY OF THE INVENTION

Conventional mechanisms and techniques for the development of software programs or hardware devices that process XML data suffer from a deficiency in that such conventional systems do not provide an efficient method, mechanism or tool to debug processing operations or steps performed on XML data. In particular, processing operations performed on XML data tend to be step-by-step operations. As an example, an XML/SOAP message may include a SOAP header, an XML encoded digital signature, and a SOAP message body. To process such an incoming XML/SOAP message, an XML processing device or software program may have to perform various processing steps such as SOAP header validation, XML signature validation, and SOAP message body extraction. Each of these steps typically receives some input, performs some focused processing on this input, and produces some output. During development of XML processing software (or hardware or firmware to perform such processing), conventional debuggers do not exist to allow the developer to control execution of the XML processing in a step-by-step manner. Additionally, no conventional debugger tool exists to allow the developer to inspect the inputs and outputs of each processing step in an XML processing pipeline. As an example, embodiments disclosed herein are based in part on the observation that it would be beneficial to, for example, run a stylesheet that captures all input/output contexts of processing steps and makes them available for developer inspection, but no conventional debugger exists providing this capability.

Embodiments disclosed herein significantly overcome such deficiencies and provide mechanisms and techniques to "mix in" additional processing steps into user-specified multistep rules related to XML processing systems via a markup language debugger. As an example, using the system disclosed herein, a developer is able to provide debug steps for a markup language processing pipeline that operate to:

Run a (set of) stylesheets before other processing;
Run a (set of) stylesheets after all other processing;
Run a (set of) stylesheets between processing steps.

As a more specific example, the system disclosed herein provides the addition of WSDM-style monitoring by operating debug steps before and after application of WSDM processing pipeline steps to collect statistics and send debug data to a management station (and external post-processing service). The system allows the user to inject the debug steps between processing steps of a processing pipeline configured within an XML processing system.

Conventional techniques for analysis and examination of XML or other markup language transaction processing currently provide a poor solution by explicitly requiring developers to hard-code custom rules for processing XML transactions to view associated or related data. This is cumbersome to encode and often results in debug data appearing in a user data. Additionally, such conventional debugging techniques that require manual modification to the processing pipeline could easily cause errors. As an example, if a user deletes the "pre" processing, but doesn't remove the "post" processing, errors may result.

In contrast, the technology disclosed herein provides a multistep probe debugger that provides an IDE-like interface to an xmlfirewall/stylepolicy. In one configuration, the debugger operates by analyzing a configured sequence of transformations (i.e. an XML pipeline of processing steps) and inserting probes or debug steps into the sequence to collect input, processing, and output data. The debug steps collect and analyze the data after the transaction has completed, or the pipeline processing can be suspended in real-time in (i.e., after) each step and a user or other processing can analyze the data in real-time (i.e. during each step of pipeline execution) before the others steps in the pipeline operate.

More specifically, embodiments disclosed herein provide methods and apparatus and systems for processing data that include a debug process. One configuration, the debug-process operates by identifying a processing pipeline defining a series of markup language processing steps. The debug process inserts at least one debug (or debugging) step into the processing pipeline. The at least one debugging step defines processing to collect debug data associated with application of the markup language processing steps to markup language data to be processed by the processing pipeline. The debug process executes the series of markup language processing steps, including the debugging step(s), upon input markup language data as a transaction. Execution of the debugging step(s) captures the debug data for at least one of the series of markup language processing steps in the processing pipeline. The debug data allows analysis of operation of the markup language processing steps of the processing pipeline on the input markup language data.

Other embodiments of the invention include any type of computerized device, network device, workstation, handheld or laptop computer, or the like configured with software and/or circuitry (e.g., a processor) to process any or all of the operations disclosed herein. In other words, a computerized device or a dedicated XML processor or network device that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application operating in a device for markup language processing. Example embodiments of the invention may be implemented within products and/or software applications manufactured by International Business Machines Corporation (IBM) of Armonk, N.Y., USA.

BRIEF DESCRIPTION OF THE SEVERAL VIEWS OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF THE INVENTION

Figure 1:
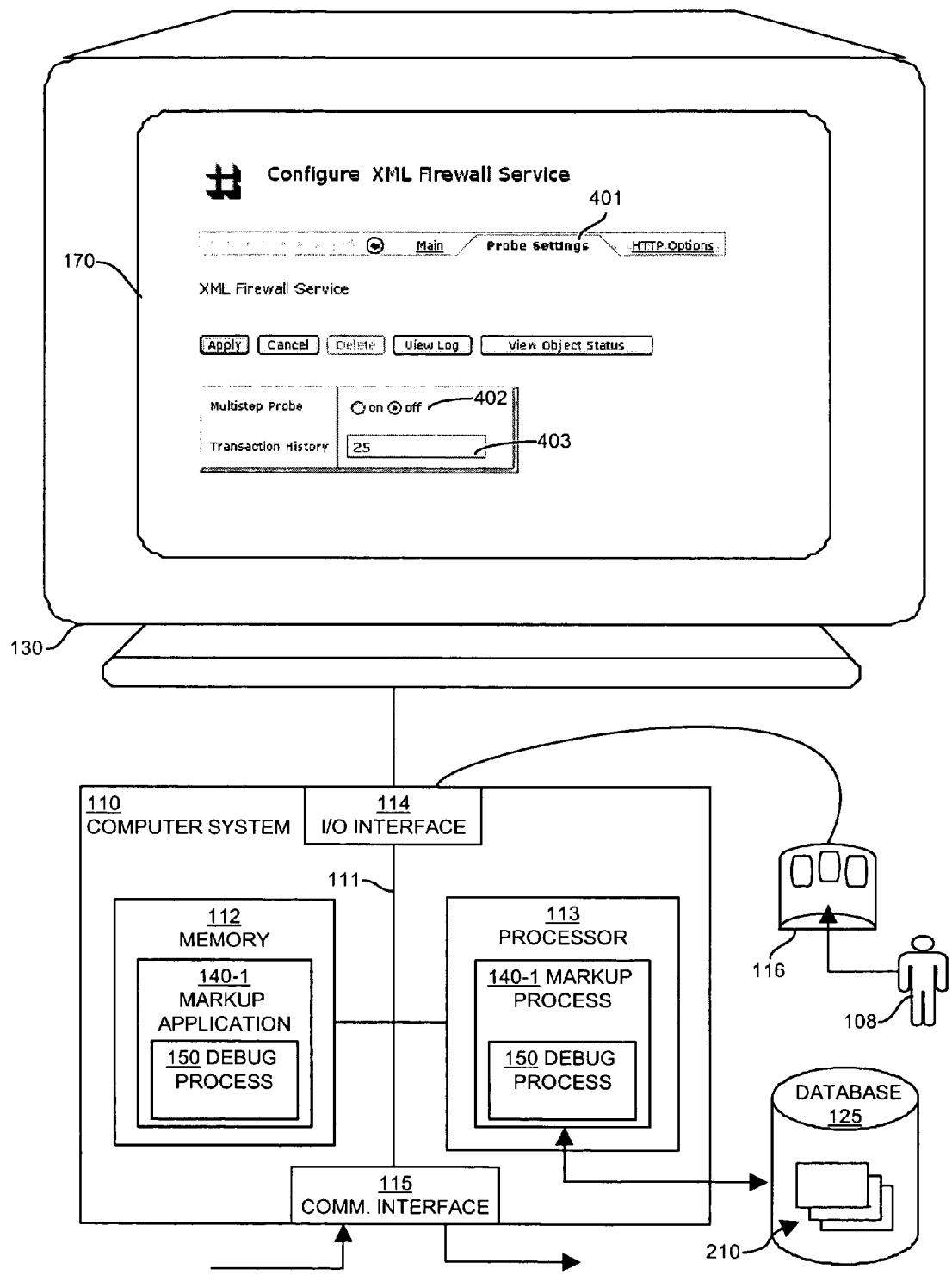
FIG. 1 is a block diagram of a computerized device configured with a markup application and debug process in accordance with one example embodiment.

FIG. 1 is a block diagram illustrating example architecture of a computerized device or system 110 that executes, runs, interprets, operates or otherwise performs a markup application 140 and process 141 that include a debug process 150 operable in accordance with example configurations disclosed herein. The computer system 110 may be any type of computerized device such as a data communications or network device (e.g. switch, router, or dedicated markup language processing device), computer, workstation, portable computing device, console, laptop, network terminal or the like. In a preferred configuration, the computerized device 110 is a dedicated network-based markup language processing device that processes markup language documents as transactions, such as XML documents, to offload XML processing from servers or other computer systems in a network environment.

As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, etc.) couples to processor 113 through I/O interface 114 and enables a user 108 such as a network administrator to provide input commands and generally control the graphical user interface 170 that the markup application 140 provides on the display 130. Also in this example configuration, a database 125 stores configuration and debug data 210 in accordance with techniques described herein within a computer readable medium. The communications interface 115 enables the computer system 110 to communicate with other devices (i.e., other network devices or computer) on a network (not shown). This can allow access to the markup application by remote computer systems.

The memory system 112 is any type of computer readable medium and in this example is encoded with the markup application 140-1 that includes a debug process 150 that supports functional debugging operations as explained herein. The markup application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the markup application 140-1. Execution of markup application 140-1 in this manner produces processing functionality in a markup process 140-2 that includes the processing of the debugger process 150. In other words, the markup process 140-2 represents one or more portions or runtime instances of the markup application 140-1 (or the entire application 140-1) performing or executing within or upon the processor 113 in the computerized device 110 at runtime. The debug process 150 is included in this processing and operates as explained herein to provide markup language debugging in a step-by-step manner.

According to the general operation of the markup application 140 and debug process 150, the computer system 110 is able to process input in the form of markup language data 105. The input markup language data 105 is processed as a transaction against a processing pipeline (see FIG. 2) configured within the markup application 140. During application of markup language processing operations within the processing pipeline, the debug process 150 is able to insert additional debug steps to perform debug operations associated with the processing pipeline. As an example, suppose the markup application 140 is configured with a processing pipeline to receive, as input, an XML document 105, and in a series of steps. The pipeline 251 progresses in steps 185 from left to right and i) performs XML document validation; ii) identifies an XML signature within the document; iii) validates the XML signature; iv) removes the XML signature from the document 105; and v) forwards the XML document 105 (after signature removal) to a post processing service. The user 108 may have selected this particular processing pipeline 251 for operation by activation of a markup language processing service available from the markup application 140, such as an XML firewall service, via interaction with the graphical user interface 170.

During activation of this XML firewall service, the graphical user interface 170 allows the user to activate the debug process 150 to work in conjunction with the processing pipeline configuration for that service. Activation of the debug process 150 allows the debug process 150 to insert debugging steps into the processing pipeline that are executed during a transaction (i.e., during application of steps in the processing pipeline to XML input data 105). Each debug step allows capturing all of transaction data related to application of steps in the processing pipeline to the input transaction markup language data 105. The debug process 150, as will be explained more fully herein, is thus able to augment or supplement the processing pipeline with additional debug steps inserted in between each of the regular processing pipeline steps (e.g., before the first step, in between each step, and after the last step) in order to allow a user 108 to examine, a step by step manner, specific processing applied within each step of the processing pipeline. Each debug step can capture, for example, system variables, input data, output data and other data related to each of the processing steps performed by the markup application 140 as that markup application operates against markup language data (or other data such as binary data encoded within the markup language data). Depending upon the configuration, the debug process 150 can either insert the debug steps 187 before application of the processing pipeline or can insert such steps in real-time, during invocation of the pipeline steps 187 on a transaction of markup language data 105.

It is noted that example configurations disclosed herein include the markup application 140-1 itself including the debug process 150 (i.e., in the form of un-executed or non-performing logic instructions and/or data). The markup application 140-1 may be stored on a computer readable medium (such as a floppy disk), hard disk, electronic, magnetic, optical or other computer readable medium. The markup application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the markup application 140-1 in the processor 113 as the markup process 140-2 including the debug process 150. Those skilled in the art will understand that the computer system 110 may include other processes and/or software and hardware components, such as an operating system not shown in this example.

A display 130 need not be coupled directly to computer system 110. For example, the markup application 140-1 and debug process 150 can be executed on a remotely accessible computerized network device via the network interface 115. In this instance, the graphical user interface 170 may be displayed locally to a user of the remote computer and execution of the processing herein may be client-server based or remotely controlled.

Figure 2:
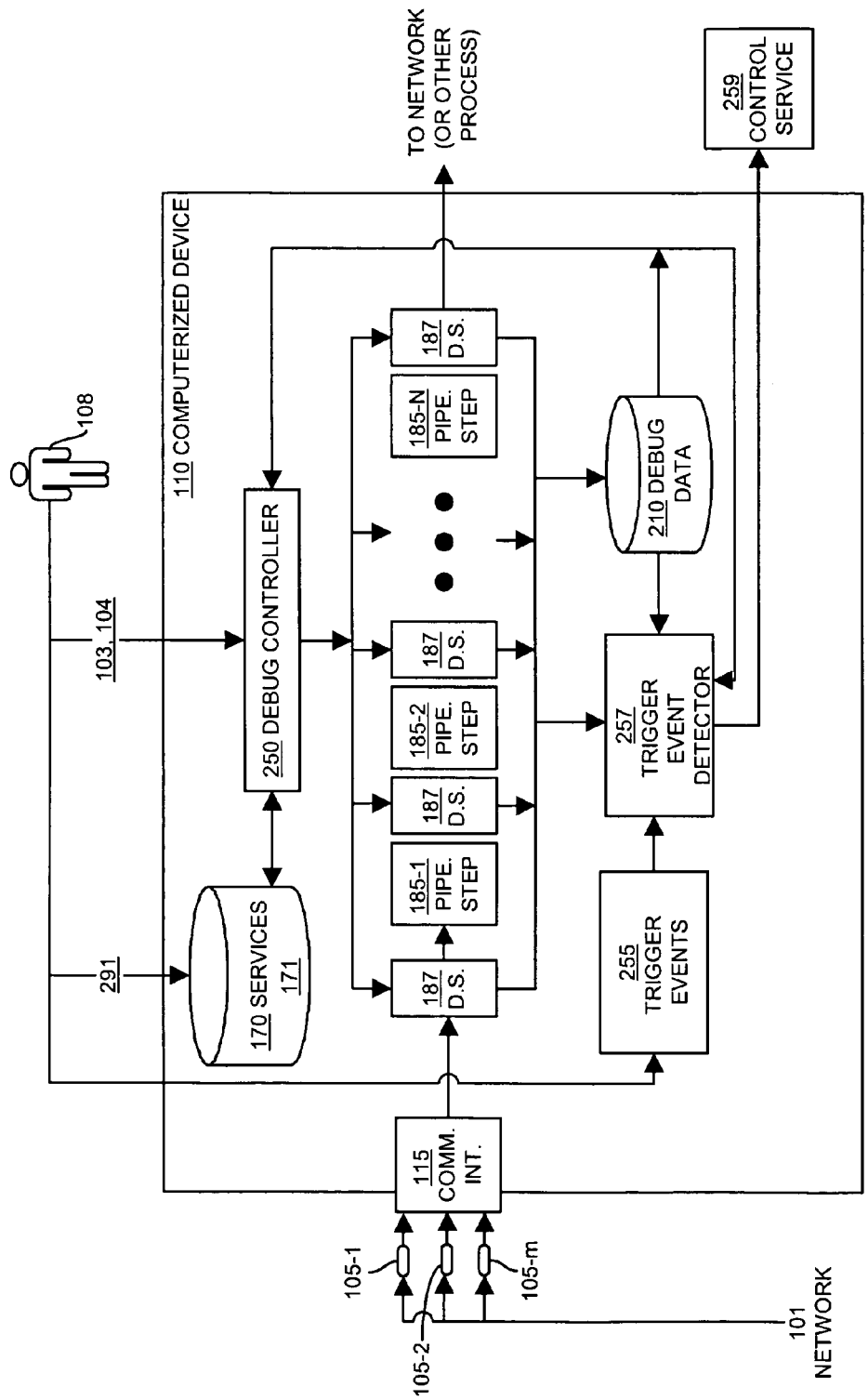
FIG. 2 is an example architecture of a debug process in accordance with one example configuration.

FIG. 2 illustrates an example architecture of the debug process 150 as it interacts with an example markup language processing pipeline 251. In this example, the debug process 150 includes the debug controller 250, trigger events 255, a trigger event detector 257, and a control service 259. Generally, the user 108 interacts 291 with the computerized device 110 to select a service configuration 171 from a plurality of available markup language processing services 170 operable within the computerized device to process markup language input data 105. Depending upon the selected service configuration 171, the markup application 140 will instantiate or apply the processing pipeline 251 that includes a number of markup language processing steps 185 selected and arranged in sequence, from left to right, according to the selected service configuration 171. Each markup language processing step 185 that is part of the processing pipeline 251 performs a specific operation on one or more portions of the input markup language data 105. The collective set of steps 185 provides the selected service chosen by the user 108. Note that there may be several different pipeline configurations 251 for a single service, and a particular pipeline (i.e. a particular arrangement of steps 185) may be chosen by the markup application 140 based on certain criteria of the input markup language data 105 during runtime. In each case however, some sequence of steps 185 are applied to the input markup language data 105 and this sequence is referred to herein as the pipeline 251. Upon selection of a service configuration 171, the user 108 activates the debug controller 250 in order to insert debug steps 187 in between the markup language processing steps 185 within the processing pipeline 251. The debug controller 250 can insert the debug steps 187 either in real-time during operation of the processing pipeline steps 185 or during instantiation of the processing pipeline 251 in the computerized device 110.

Each debug step 187 operates to capture debug data 210 for analysis by either the debug controller 250 or a remotely located control service 259. Accordingly, upon receipt of each input markup language data document 105, that markup language input data 105 is applied is a transaction to the processing pipeline 251 and each steps 185 is performed on the input data 105. In between each pipeline step 187 (or before the first, between each middle step 185, and after the last pipeline step), each debug step 187 captures a set of debug data 210 that, if certain trigger conditions 255 are met, is eligible for post-processing analysis (or real-time analysis in step-by-step mode, as will be explained). The user 108 can defined trigger events or conditions 255 that specify certain conditions that must be met in order to save or store the debug data 210, or to transfer the debug data 210 to the remotely operating control service 259 via a messaging protocol 192. In other words, the user 108 can define specific trigger events 255 that the triggered event detector 257 must identify as existing in order for the debug data 210 to be saved or processed for analysis of application of one of the processing pipeline steps 185. In one configuration then, the debug steps 187 are executed for each transaction of markup language input data 105, regardless if the debug data 210 they produce is to be saved or analyzed. However, only in situations upon which a triggered event 255 is detected by the triggered event detector 257 is the debug data 210 saved for analysis. In an alternative configuration, upon occurrence of a trigger event 255, the pipeline processing is halted in a debug step 187 and the currently captured debug data 210 and control is transferred to the control server 259 (or to the debug controller 250 if analysis in step by step mode is being performed locally on the same computerized device 110) to allow the user 108 to inspect the current debug data for the most recently applied pipeline step 185. The user can then allow execution of the pipeline to continue, step by step, and can view the processing applied at each step 185 upon occurrence of the next debug step 187 (that debug step halting execution of the pipeline and engaging a messaging protocol 192 to transfer the debug data 210 to a the control server 259 (or to the debug controller 250) allowing the user to have step-by-step control.

Further details of processing in accordance with example embodiments will now be explained with respect to the flowcharts of processing steps that follow.

Figure 3:
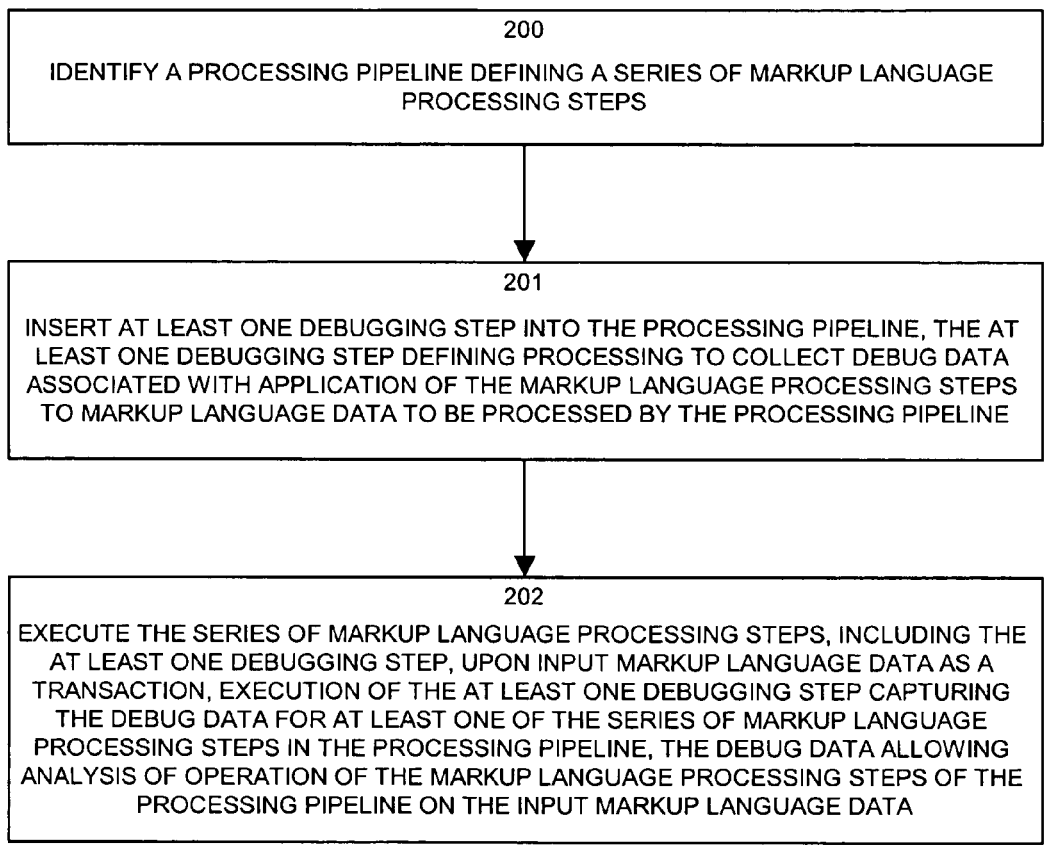
FIG. 3 is a flow chart of high level processing steps that the debug process performs in accordance with example configurations disclosed herein.

FIG. 3 is a flow chart of processing steps that a configuration of the debug process 150 operating in the markup application 140 performs to process markup language data 105 is a transaction within the processing pipeline 251.

In step 200, the debug process 150 identifies a processing pipeline defining a series of markup language processing steps 185. Identification of the processing pipeline can take place when the user 108 selects a particular service to activate within the computer system 110 in order to apply the service configuration 171 associated with the user selected service to input markup language data 105 as it passes through the computer system 110.

In step 201, the debug process 150 inserts at least one debugging step into the processing pipeline 251. The debugging step(s) 187 define processing to collect debug data 210 (e.g. next step input and previous step output and system variables and execution trace information) associated with application of the markup language processing steps 185 to markup language data 105 that has been or is to be processed by the processing pipeline 251. Further details of this will be explained with respect the flowcharts in the figures that follow.

In step 202, the debug process 150 executes the series of markup language processing steps 185, including the debugging step(s) 187, upon input markup language data 105 as a transaction. Execution of the debugging step(s) captures the debug data 210 for at least one of the series of markup language processing steps 185 in the processing pipeline 251. The debug data 210 allows analysis of operation of the markup language processing steps 195 of the processing pipeline on the input markup language data as will be explained more fully herein. Note that step 201 may be performed as part of step 202 in real-time.

As an example, a debug step 187 between two markup language pipeline steps 185 captures output from the proceeding pipeline markup language processing step 185, and captures input to the next markup language processing step. As an example, each debug step 187 can capture step context including all or a part of an XML document 105, portions of a parsed XML tree, a binary data block, an attachment (e.g. a mime attachment) to the message 105, stylesheet parameters, global and/or local variables (user defined for use by the pipeline), as service intrinsic data such as system variables, client and peer identities, URL information, TCP/IP port numbers and other protocol specific data, and the like. Additionally, each debug step 187 between two pipeline steps 185 can capture output of the proceeding step 185 such as an execution trace of the step 185 indicating i) how that step traversed the XML programming language; ii) information on XSLT extension functions used during processing in that step 185 such as which XSLT extension function was called, what that function's inputs were, and what the XSLT extension function produced as output. The debug process can save this debug data into a zip file for subsequent post-processing access.

Depending upon the configuration, the multi-step debugger process 150 distinguishes between two levels of granularity. The first one is the sequence of user configured actions defined within the pipeline 151 as user defined steps 185 as determined by the user selected service configuration 171. Those pipeline steps 185 can perform markup language transform actions, data and message routing actions, fetching resources, posting resources, authentication, and so forth. In one configuration, the debug process 150 controls the flow of information (i.e. capturing of context) between those actions or steps 185 by auto-inserting the debug steps 187 in real-time in between the user-configured pipeline steps 185. Those inserted debug actions or steps 187 collect all useful operational data (call and execution traces) from the prior finished processing step 185 as well as the input parameters of the next processing step 185. In one configuration, each debug step 187 sends the collected data to a prior configured passive or active probe (server component) such as the control server 259 via a messaging protocol (e.g. XML/SOAP) 192.

If the control server 259 is operating as a passive probe then the processing policy will continue with the next pipeline step 185 and the process is repeated until all pipeline steps 185 and debug steps 187 are executed. The collected debug data 210 is correlated using sequence and transaction identifications and the user 108 is able to examine the transaction debug data 210 after completion of the pipeline, allowing the user 108 to browse and analyze stored debug data 210 afterwards.

In an alternative configuration, the debug process 150 operates as an active probe and inserts debug steps 187 in real-time into the pipeline 251 and allows the user 108 to halt the processing of the multi-step processing pipeline 251 on a per debug step 187 basis as explained above. Furthermore, this configuration allows the user to, for example, change one or more values of input parameters prior to continuing execution of the next pipeline processing step 185 and allows for real time execution of these steps with the new value. This lets users 108 experiment with different markup language data and modify input 105 during application of the steps 185 in the pipeline 251.

In another configuration, the other level of granularity includes individual instructions within one stylesheet. In this configuration, a compiler (not shown) operating in conjunction with the debug process 150 collects an execution trace of each pipeline step 187 as it executes any stylesheet instructions. The debug process 150 collects line, instruction type, variable values, output generated, and so forth as part of the debug data 210. The execution trace is collected by the debug step 187 that follows execution of the pipeline step 185 that executed the stylesheet instructions. The debug data 210 is detailed enough to allow the user 108 to follow the execution flow after the stylesheet execution. Combined with an active probe, the user 108 is able to physically execute one of the pipeline processing steps 185, then execution control and collected debug data 210 are handed over to the user 108, and the user is able to step through the execution trace of the executed pipeline processing step 185, examine the collected debug data 210, modify the input to the next step 185 if required or desired, and then return execution control back to multi-step pipeline 251 and the next pipeline processing step 185 is executed. In this manner, the system disclosed herein enables step-by-step debugging of markup language processing. Further details will now be explained with a more detailed flow chart.

Figure 4:
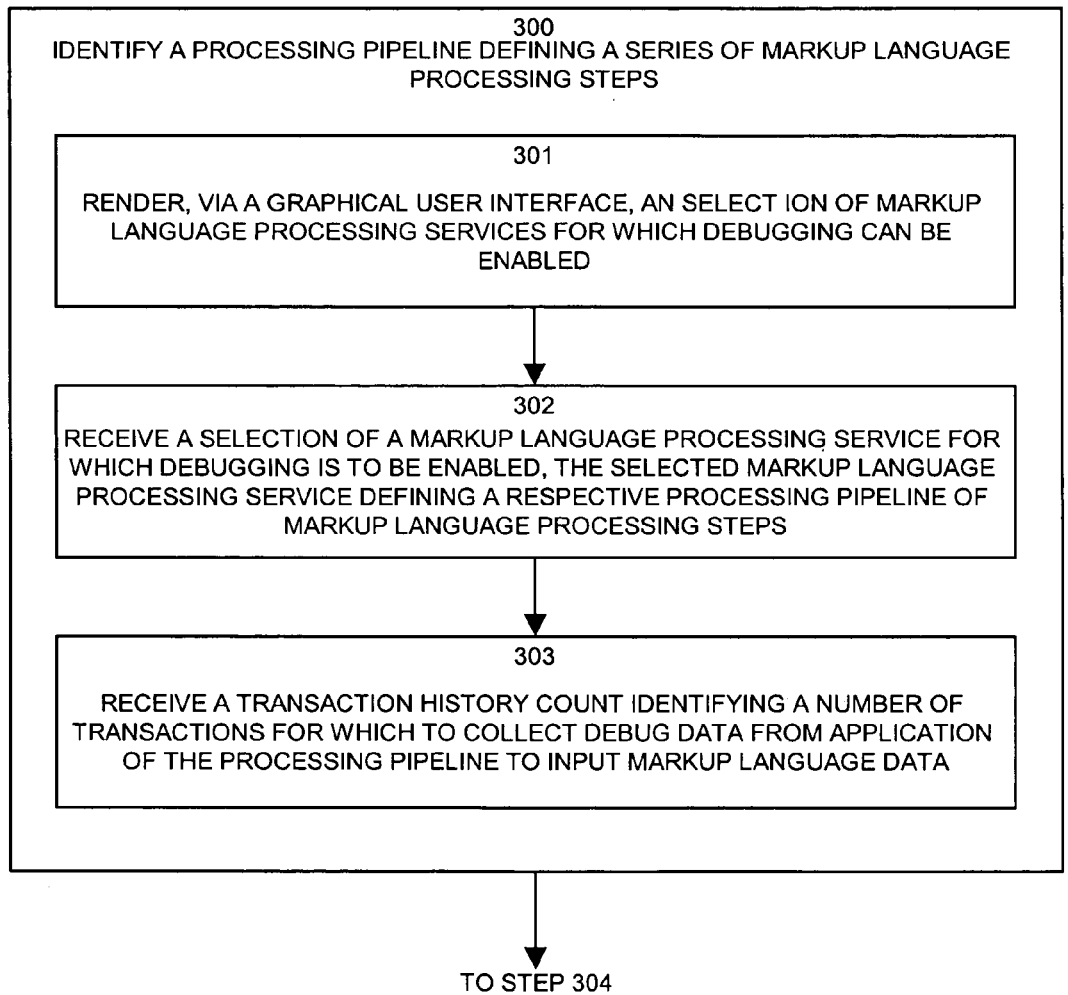
FIGS. 4 through 6 are a flow chart of processing steps that a debug process performs to collect debug data from a markup language processing pipeline in accordance with example configurations.
Figure 5:
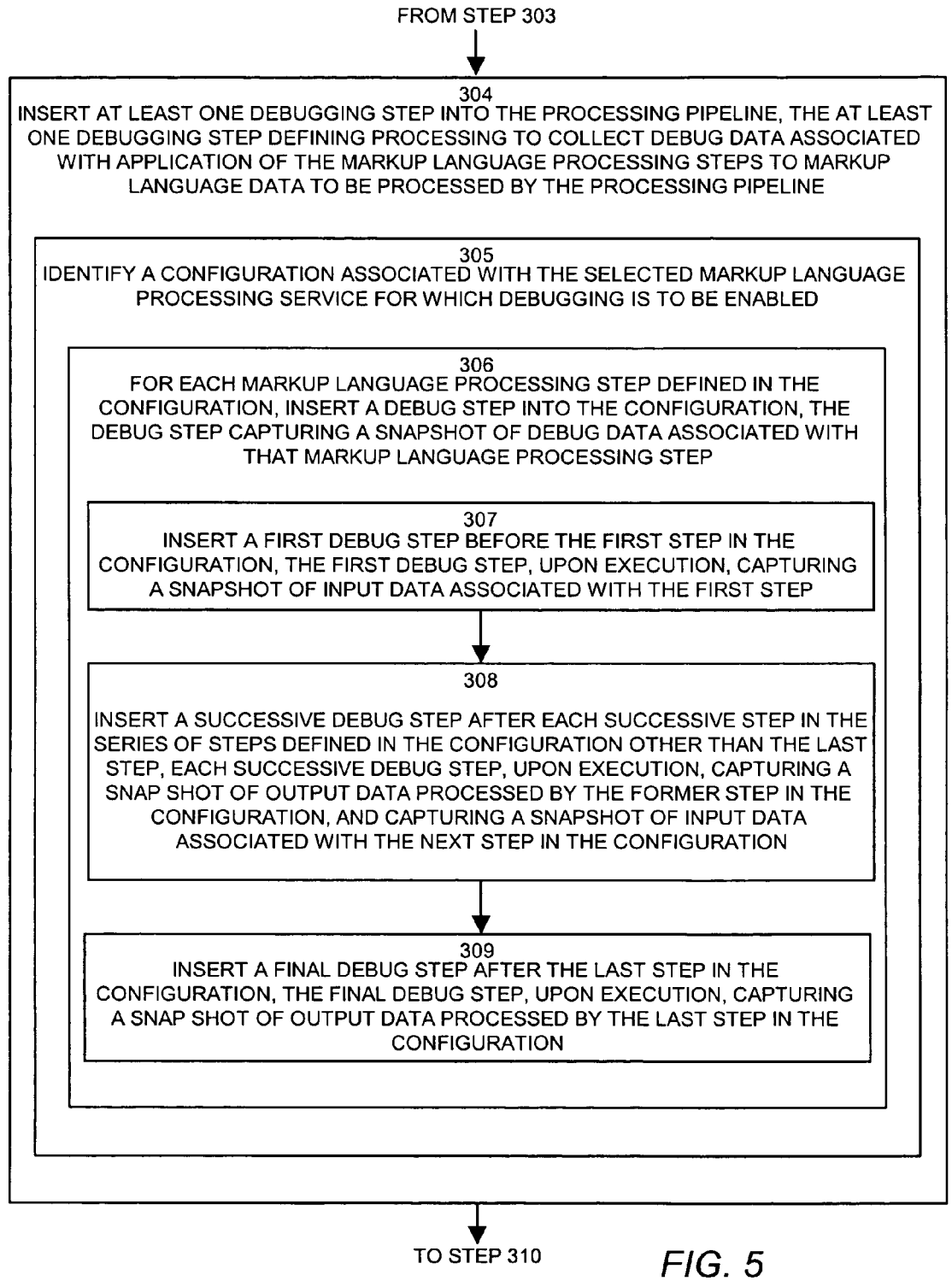
Figure 6:
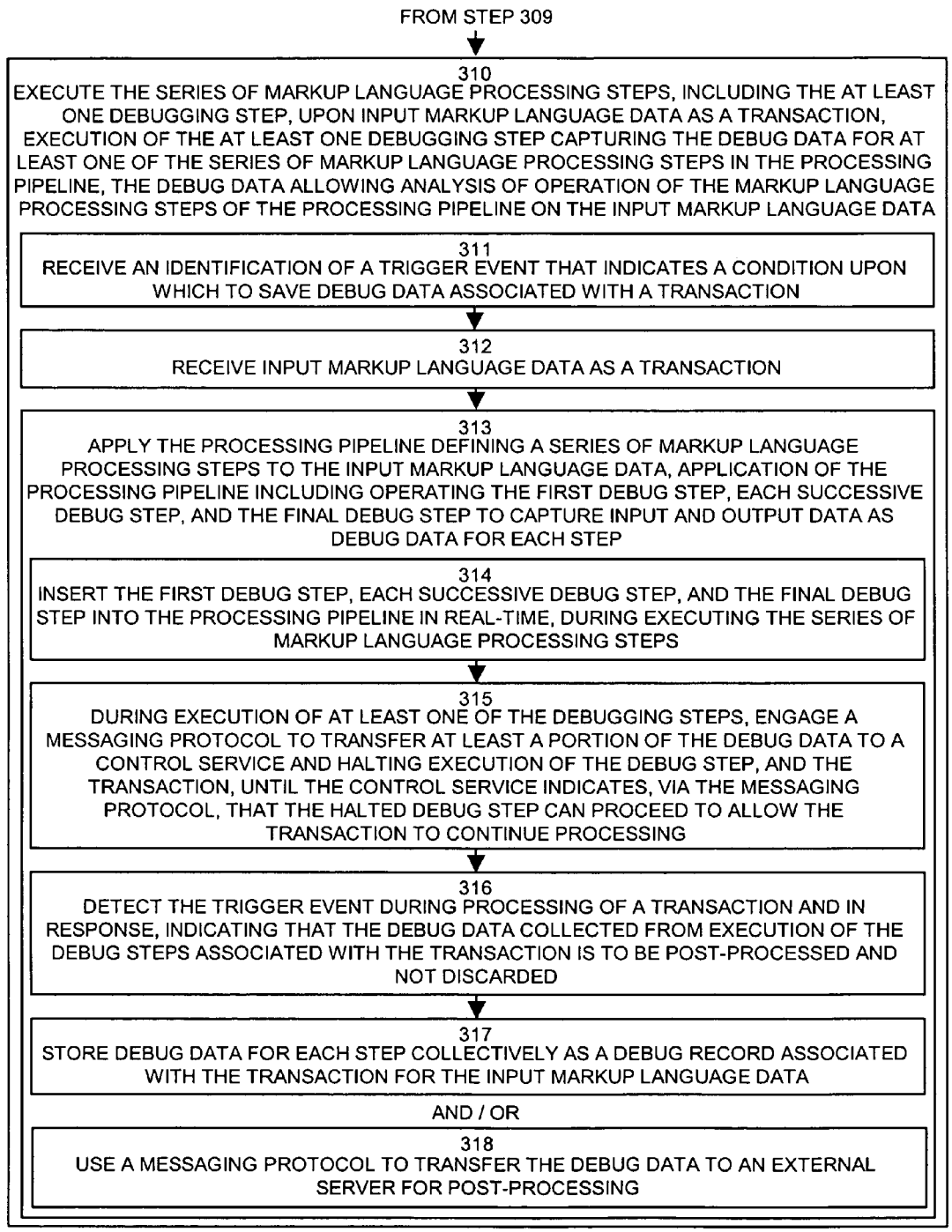

FIGS. 4 through 6 are a single flow chart of processing steps that explain further details of the high-level processing steps described above in FIG. 3.

In step 300, the debug process 150 identifies a processing pipeline defining a series of markup language processing steps 185, just as in step 200 above in FIG. 3. Details of processing step 300 to be explained in steps 301 through 303.

In step 301, the debug process 150 renders, via a graphical user interface, a selection of markup language processing services for which debugging can be enabled. Services that can be activated in one configuration include a multiprotocol gateway service, an XML firewall service, a web proxy service, an XSL proxy service, an XSL coprocessor service, and a web application firewall.

In step 302, the debug process 150 receives a selection of a markup language processing service for which debugging is to be enabled. The selected markup language processing service allows the user to matching criteria for matching messages and rules to apply in the event of a match. Each rule results in application of a sequence of steps 185 that define the processing pipeline or sequence (e.g., a service configuration 171 in FIG. 1) of markup language processing steps 185.

FIG. 1 includes an example screenshot of the graphical user interface 170 in which the user 108 has selected an XML firewall service 401 to be applied to input markup language data transactions 105 (i.e., XML documents received by the computerized device 110). In this figure, the user 108 is viewing a "Probe Settings" tab and can elect to turn multi-stepped debugging on or off via radio button 402. Assume for this example that the user enables the multistep probe which activates the debugging process 150 to apply the processing pipeline 251 that defines or includes processing steps 185 for application of an XML firewall service to input markup language data 105.

Returning attention back to the flowchart of processing steps in FIG. 4, in step 303, the debug process 150 receives a transaction history count (403 in FIG. 7) identifying a number of transactions for which to collect debug data 210 from application of the processing pipeline 251 to input markup language data 105. This transaction history count indicates how many sets of debug data to save at one time.

After processing step 303, debug process processing continues and step 304 in FIG. 5.

FIG. 5 is a flowchart of processing that continues description of processing performed by the debug process 150.

In step 304, the debug process 150 inserts at least one debugging step into the processing pipeline 251, just as in step 201 in FIG. 3. Further details of processing step 304 will now be explained with respect to steps 305 through 309 below.

In step 305, the debug process 150 identifies a configuration associated with the selected markup language processing service for which debugging is to be enabled. Depending upon the service selected by the user 108, a particular service configuration 171 that defines which particular processing steps 185 are to be applied to the processing pipeline 251 is inherently selected. As an example, the debug process 150 can receive a selection of an XSL proxy service, an XML firewall service, an XSL coprocessor service, a Multi-protocol gateway service, a web proxy service, or a Web application firewall service. Each service presents an application for use of the computerized device 110 against input data 105. A user 108 can configure a particular service to create a processing policy that consists of a set of processing rules to be included in that service. Each rule has a set of certain matching criteria that the user can establish. As an example, service matching criteria can define a particular URL upon which input markup language data 105 is posted upon. As another example, service matching criteria can indicate a specific IP address, protocol port number or other information upon which input data 105 is received. Each rule, if matched, applies the service as a discrete number of N processing steps 185, the collection of which, depending upon the configuration of the service, define the processing pipeline 251 to be applied to markup language input data documents 105 each processed as a transaction against the pipeline 251.

Based on the matching criteria, the device selects the rule of the service to be applied (the rule defining a set of steps 185) for an input transaction 105. Once the system has matched a input markup language data message 105 to a rule, it has defined the steps 185 in that rule to be applied to that input data. The matching criteria allows the device 110 to apply certain services to some messages by selecting which rule to run. As an example, if a message 105 arrives and indicates a signature is included, then the services will run a "signature" rule that includes the steps 185 (i.e., a processing pipeline) to validate the XML signature, remove the XML signature, and transfer the message to another process (e.g. back onto a network). The user 108 can set up the order of the rules for a particular service, and each rule defines a set of steps 185 to be applied. Other examples of steps 185 include printing a message, checking for illegal content, performing schema validation, encrypting messages and so forth. The steps 185 that make up a rule for particular service configuration 171 define the various processing pipeline 251 that are applied to input data 105 treated as a transaction across the set of steps for the processing pipeline.

Accordingly, in step 306, for each markup language processing step 185 defined in the configuration, the debug process 150 inserts a debug step 187 into the configuration. The debug steps 187 capture a snapshot of debug data 210 associated with that markup language processing step 185 (between which it is inserted). Steps 307 through 309 to illustrate details of processing.

In step 307, the debug process 150 inserts a first debug step before the first step 185-1 in the configuration. The first debug step 187-1, upon execution, captures a snapshot of input data associated with the first step 185-1.

In step 308, the debug process 150 inserts a successive debug step 187 after each successive step in the series of steps defined in the configuration other than the last step. Each successive debug step, upon execution, captures a snap shot of output data processed by the former step in the configuration, and captures a snapshot of input data associated with the next step in the configuration.

In step 309, the debug process 150 inserts a final debug step after the last step in the configuration. The final debug step, upon execution, captures a snap shot of output data processed by the last step in the configuration. In this manner, processing pipeline configuration 251 is augmented or supplemented with debug steps 187 that capture debug data 210.

In step 310, the debug process 150 executes the series of markup language processing steps 185, including the debugging step(s) 187, upon input markup language data 105 as a transaction. Execution of each debug step 187 between two pipeline steps 185 (or after the last pipeline step 185) can capture output of the proceeding pipeline step 185 such as an i) an execution trace of the pipeline step 185 indicating how that step traversed the XML programming language; ii) information on XSLT extension functions used during processing in that step 185 such as which XSLT extension functions were called, what the function inputs were, and what the XSLT extension function produced as output. Furthermore, execution of a debug step 187 can also involve capturing debug step input (or output) context including all or a part of an XML document 105, portions of a parsed XML tree, a binary data block, an attachment (e.g. a mime attachment) to the message 105, stylesheet parameters, global and/or local variables (user defined for use by the pipeline), as service intrinsic data such as system variables, client and peer identities, URL information, TCP/IP port numbers and other protocol specific data, and the like. Steps 311 through 318 illustrate further details of processing.

In step 311, the debug process 150 receives an identification of a trigger event 255 that indicates a condition upon which to save debug data 210 associated with a transaction 105.

In step 312, the debug process 150 receives input markup language data 105 as a transaction.

In step 313, the debug process 150 applies the processing pipeline 251 defining a series of markup language processing steps 185 to the input markup language data 105. Application of the processing pipeline includes operating the first debug step, each successive debug step, and the final debug step to capture input and output data as debug data 210 for each step. Steps 314 through 318 illustrate details of processing.

In step 314, the debug process 150 inserts the first debug step, each successive debug step, and the final debug step into the processing pipeline in real-time, during executing the series of markup language processing steps. This allows insertion of debug steps one by one as each pipeline step is executed. In an alternative arrangement, the debug process 150 inserts the first debug step, each successive debug step, and the final debug step into the configuration defining the processing pipeline 251 prior to application and execution of any markup language processing steps 185 in the processing pipeline upon input markup language data. Thus the pipeline with debug steps in this alternative configuration is preconfigured with debug steps (as opposed to inserting the debug steps in real-time) to allow faster execution of the pipeline and debug steps.

In step 315, during execution of the debugging steps 187, the debug process 150 operates in a step-by-step probe mode and engages a messaging protocol 192 (FIG. 2) to transfer at least a portion of the debug data 210 to a control service 259 (e.g., operating remotely, or the debug controller 250 operating locally) and halts execution of the debug step 187, and the transaction, until the control service 259 indicates, via the messaging protocol 192, that the halted debug step 187 can proceed to allow the transaction to continue processing to the next step 185. In this manner, the control service 259 (or debug controller 250) allows step-by-step control and analysis of the debug data before letting the steps in the pipeline 251 continue to process the transaction.

In step 316, the debug process 150 detects a trigger event 255 during processing of a transaction and in response, indicates that the debug data 210 collected from execution of the debug steps associated with the transaction is to be post-processed and not discarded (or passed to the control service 259). This step may be performed before or after step 315. Thus, trigger events can cause only some transactions to have their debug data 210 analyzed or stored.

In step 317, the debug process 150 stores debug data for each step collectively as a debug record associated with the transaction for the input markup language data 105. In one configuration, the debug process 150 saves all debug data in records within a zip file for post-processing analysis.

In step 318, the debug process 150 uses a messaging protocol to transfer the debug data 210 to an external server (e.g. control service 259) for post-processing. This step thus operates a debug server that receives the output of the debug step, and saves the debug data 210 and transfers this data to a remote location, allowing external control of the computerized device 110. This step can involve the externally operating controller service 259 that does not allow pipeline execution to continue until the external control program or service

259 is instructed by the user 108 or another program to allow the pipeline to advance to the next step 185.

Appendix A below is a user manual of a multi-step markup language debugger configured in accordance with example embodiments disclosed herein. This appendix includes screen shots of a graphical user interface 170 that shows a graphical view of the debug data captured from operation of a pipeline of processing steps 185. As shown, the user can step through execution of each action in each rule. Along the bottom of the graphical user interface 170 is a window showing log messages for a transaction. Along the side are windows showing each multistep context and all of their contents, all var://context variables (including system ones)—and all changes dynamically as the user steps through the action. The input and output messages are automatically captured and displayed in their own windows. In one configuration, windows showing the routing and arp tables, with the relevant chosen route and arp entries highlighted as the action progresses and messages are sent/received. So for each action a user can see the whole state of the pipeline which may be relevant for the transaction at that time. The multistep debugger pulls all of the disparate pieces of debug information together into a single real-time view and gives the user a nice way to drive the debugging session rather than simply turning features on/off for given time periods or thresholds.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

Appendix A:

The following Appendix provides an example of a user manual for a multi-step probe markup language debugger that operates in accordance with one example configuration.

MultiStep Probe

The MultiStep Probe displays the contents of contexts and the value of variables at each step of a document processing rule, which may contain one or many steps. This is an invaluable tool for developing service applications.

Enabling the MultiStep Probe

The MultiStep Probe is enabled on the Object pages for the service using the multistep processing policy. These pages are covered in detail in the WebGUI Service Objects chapter.

An XML Firewall, XSL Proxy and XSL Coprocessor can use the MultiStep Probe. Use the following procedure to enable the MultiStep Probe.

1. Open the Object menu area and click on the Edit XML Firewall, Edit XSL Proxy or Edit XSL CoProcessor menu links. A catalog page appears. Click on the name of the service for which you want to enable the MultiStep Probe. Here is an example XML Firewall object page.

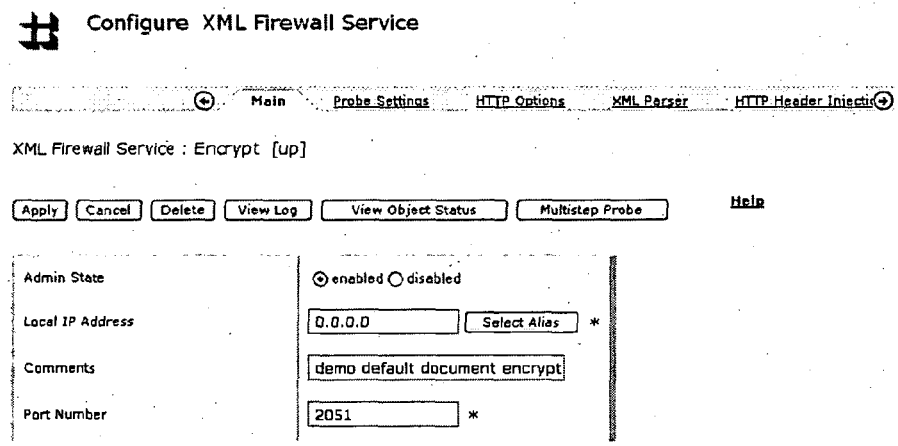

Figure 6 - 42. Example XML Firewall object page

2. In every case, there is a Probe Settings and a Probe Triggers tab. Click the Probe Settings tab to enable the MultiStep Probe. The Probe Settings page appears as follows:

Defining a Document Processing Policy
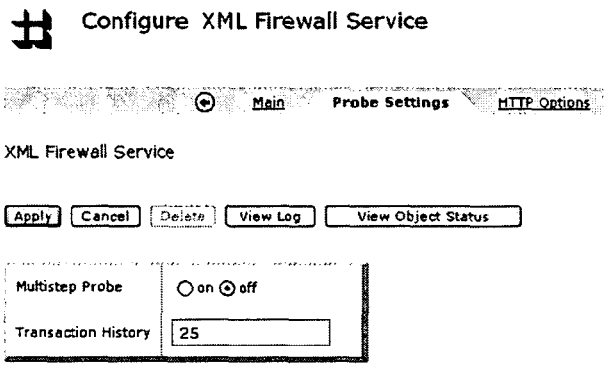
Figure 6 - 43. Probe Settings page
3. Use the MultiStep Probe radio buttons to turn the Probe On. Then click Apply. The MultiStep Probe button appears on the page, as shown here.
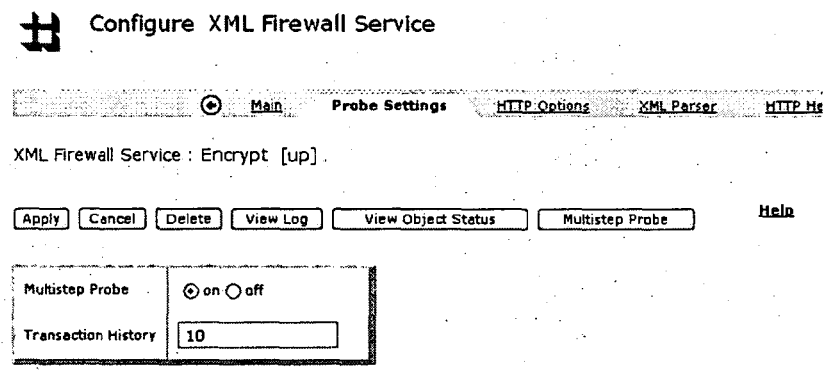
Figure 6 - 44. MultiStep Probe button enabled MultiStep Probe

Using the MultiStep Probe

Send some traffic to the service for which the Probe is now enabled. (You can generate traffic using cURL. See http://curl.haxx.se for more information about this utility.) Then click the MultiStep Probe button. The MultiStep Probe Transaction History page appears in a new browser window.

| view | trans-id | inbound-url | outbound-url | type | rule | client-ip |
|---|---|---|---|---|---|---|
| 🔍 | 1985 | http://10.10.13.35:2051/ | http://0.0.0.0:2051/ | request | Demo-Encrypt_Rule_0 | 10.10.100.151 |
| 🔍 | 1993 | http://10.10.13.35:2051/ | http://0.0.0.0:2051/ | request | Demo-Encrypt_Rule_0 | 10.10.100.151 |
| 🔍 | 2001 | http://10.10.13.35:2051/ | http://0.0.0.0:2051/ | request | Demo-Encrypt_Rule_0 | 10.10.100.151 |
| 🔍 | 2009 | http://10.10.13.35:2051/ | http://0.0.0.0:2051/ | request | Demo-Encrypt_Rule_0 | 10.10.100.151 |
| 🔍 | 2017 | http://10.10.13.35:2051/ | http://0.0.0.0:2051/ | request | Demo-Encrypt_Rule_0 | 10.10.100.151 |
| 🔍 | 2025 | http://10.10.13.35:2051/ | http://0.0.0.0:2051/ | request | Demo-Encrypt_Rule_0 | 10.10.100.151 |
| 🔍 | 2033 | http://10.10.13.35:2051/ | http://0.0.0.0:2051/ | request | Demo-Encrypt_Rule_0 | 10.10.100.151 |
| 🔍 | 2041 | http://10.10.13.35:2051/ | http://0.0.0.0:2051/ | request | Demo-Encrypt_Rule_0 | 10.10.100.151 |
| 🔍 | 2049 | http://10.10.13.35:2051/ | http://0.0.0.0:2051/ | request | Demo-Encrypt_Rule_0 | 10.10.100.151 |
| 🔍 | 2057 | http://10.10.13.35:2051/ | http://0.0.0.0:2051/ | request | Demo-Encrypt_Rule_0 | 10.10.100.151 |

Figure 6 - 45. Probe transaction list display

The length of this transaction list is determined by the value of the Transaction History field of the Probe Settings page associated with the service (Figure 6-44 above).

Click the leftmost magnifying glass icon to display the details of the transaction. Here is an example of the MultiStep Probe display:

Defining a Document Processing Policy
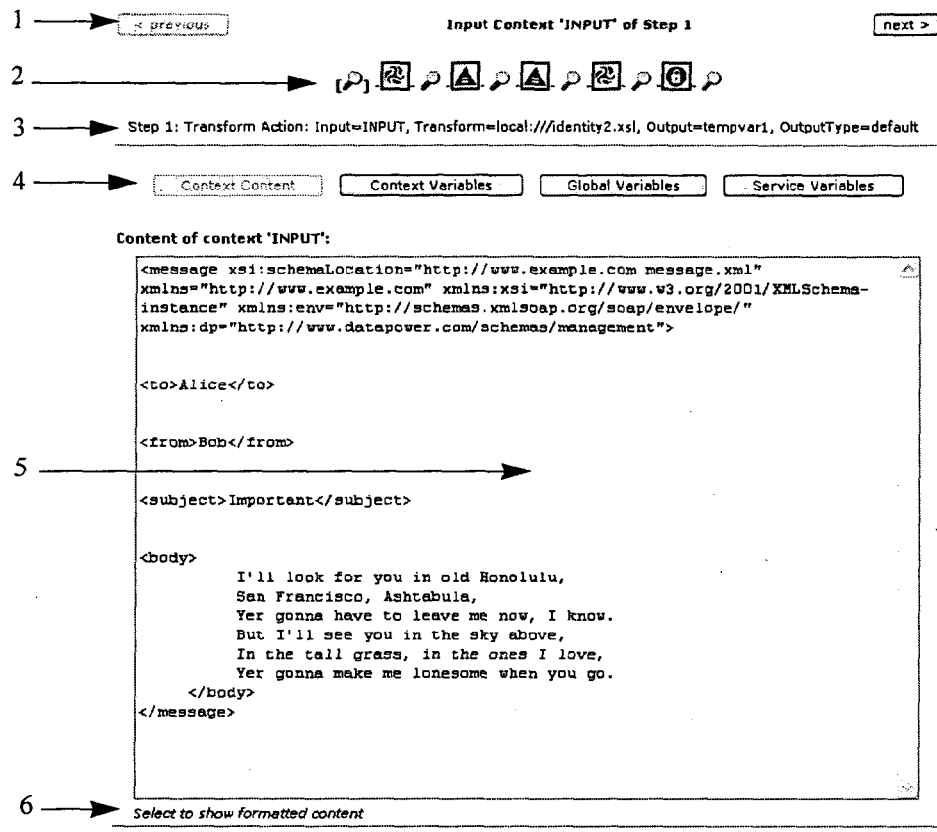
Figure 6 - 46. MultiStep Probe Content display
Probe Display Elements
1. Step Navigation Buttons. Press Previous or Next to move to the next step. This is another way to achieve the same results as using the Input and Action Detail selector icons.

MultiStep Probe

2. Input and Action Detail selector icons. The top line of icons follow the various steps of the rule being probed.

Figure 6 - 47. Steps

The selected input. This is the input context to the action that follows it. Thus, the leftmost magnifying glass is the INPUT context, containing the document submitted to the service for processing. The rightmost magnifying glass is the OUTPUT context, containg the information output by the service to the configured output destination.

The selected action. Clicking any of the action icons changes the main display of the probe. Rather than the context information, trace information for the action itself is available, as shown here.

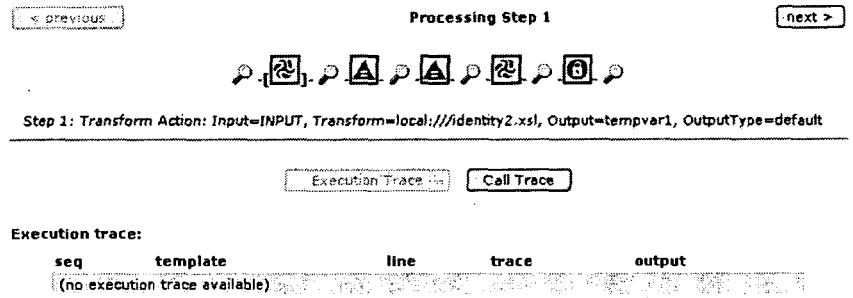

Figure 6 - 48. Action trace display

Click Call Trace to display information about actions that interact with resources outside of the service. Specifically, stylesheets that use any of the following extension functions will produce a Call Trace.

| | |
|---|---|
| soap-call | radius-authen |
| url-open | netegrity-authen |
| ldap-authen | get-kerberos-ticket |
| tivoli-authen | ocsp-validate-certificate |

Defining a Document Processing Policy

3. Context Information. This line of text details the input name, the action and the output name. Here is an example:

```
Step 2: Set Variable Action: Context=tempvar1, Variable=var://local/plainname, Value=snafu, ErrorMode=abort,
                                        OutputType=default
```

Figure 6 - 49. Step information

4. Context Display Buttons. Use these buttons to control the main context display. By default, the Context Content button is active.

[ Context Content ] [ Context Variables ] [ Global Variables ] [ Service Variables ]

Figure 6 - 50. Context display buttons a. Click Context Variables to display the value of any context variables. These are variables created by either a Setvar action or by the stylesheet used in a previous action. Here is an example of a Context Variables display.

```
[ < previous ]           Input Context 'tempvar4' of Step 5              [ next > ]

ρ 📋 ρ 🅰 ρ 🔄 ρ 📋 ρ 🅾 ρ

Step 5: Transform Action: Input=tempvar4, Transform=store:///encrypt.xsl, Output=OUTPUT,
                          StylesheetParameters= , OutputType=default

[ Context Content ]  [ Context Variables ]  [ Global Variables ]  [ Service Variables ]

Variables in context 'tempvar4':
        name                                        type        value
        var://local/plainname                       string      'snafu'
```

Figure 6 - 51. Context variables display b. Click Global Variables to display the value of global variables. Global variables can be created in a number of ways. All variables created as "var://system/*varname*" appear here. These variables persist beyond the multistep processing scope (see *Contexts* section at the beginning of this chapter for more information). All variables created as "var://context/*contextname*/*varname*" appear here. You will notice that variables created as "var://local/*varname*" also appear here as "var://context/*varname*" for each context that has been created since the variable was created. Here is an example display.

Figure 6 - 52. Global variables

Defining a Document Processing Policy c. Click Service Variables to display the various Service variables available to the processing steps. These are read only, with the exception of error-protocol-response, which may be set by a stylesheet during processing. Here is an example display.

| name | type | value |
|---|---|---|
| var://service/error-code | string | '0x00000000' |
| var://service/error-headers | string | (empty string) |
| var://service/error-message | string | (empty string) |
| var://service/error-protocol-response | string | '0' |
| var://service/input-size | string | '574' |
| var://service/processor-type | string | 'XML Firewall' |
| var://service/system/frontwsdl | string | 'local:///Encrypt_generated.wsdl' |
| var://service/time-forwarded | string | '0' |
| var://service/time-response-complete | string | '0' |
| var://service/time-started | string | '0' |
| var://service/transaction-client | string | '10.10.100.151' |
| var://service/transaction-id | string | '4702' |
| var://service/transaction-policy-name | string | 'Demo-Encrypt' |
| var://service/transaction-rule-name | string | 'Demo-Encrypt_Rule_0' |
| var://service/transaction-rule-type | string | 'request' |
| var://service/transaction-session-id | string | '0' |
| var://service/URI | string | '/' |
| var://service/URL-in | string | 'http://10.10.13.35:2051/' |
| var://service/URL-out | string | 'http://0.0.0.0:2051/' |
| var://service/xmlmgr-name | string | 'default' |

Figure 6 - 53. Service variables

5. The main window of the Context display page shows the content of the currently selected context. An alternate view of this content can be rendered. See 6 below.

6. Click *Select to show formatted content* at the bottom of the display when the Context Content button is active to view the context content as xml rather than text. Here is an example of the display.

MultiStep Probe

Content of Context 'tempvar4':

```
<message xsi:schemaLocation="http://www.example.com message.xml" xmlns="
http://www.example.com" xmlns:xsi=" http://www.w3.org/2001/XMLSchema-instance">
    < to>Alice</ to>
    < from>Bob</ from>
    < subject>Important</ subject>
    < body>I'll look for you in old Honolulu, San Francisco, Ashtabula, Yer gonna have to
    leave me now, I know. But I'll see you in the sky above, In the tall grass, in the ones I
    love, Yer gonna make me lonesome when you go.</ body>
</ message>
<prints xmlns:func=" http://exslt.org/functions" xmlns:date=" http://exslt.org/dates-and-
times">
    < transid>4702</ transid>
    < urlin>http://10.10.13.35:2051/</ urlin>
    < starttime>2005-01-25T21:41:01-05:00</ starttime>
    < endtime>2005-01-25T21:41:02-05:00</ endtime>
    < local>snafu</ local>
</ prints>
```

Figure 6 - 54. Formatted content display

To exit the probe, close the popup windows it creates.

Defining a Document Processing Policy

You can quickly access the Probe for any service from the catalog page for that service. Here is an example for XML Firewalls. Note the Probe column. The icon indicates the probe is active for that service.

Configure XML Firewall Service

[Refresh]

| Name | Op-State | Logs | Probe | Local IP Address | Port Number | XML Firewall Policy | Comments |
|---|---|---|---|---|---|---|---|
| AAAWizard | up | 🔎 | | 0.0.0.0 | 2055 | AAAWizard | |
| Crypopt | up | 🔎 | | 0.0.0.0 | 2052 | DemoVert-encrypt | Crypto enabled demo |
| Decrypt | up | 🔎 | | 0.0.0.0 | 2049 | Decrypt | Demo document decryption |
| DecValSign | up | 🔎 | | 0.0.0.0 | 2050 | DecSign | decrypt, validate, and sign |
| Encrypt | up | 🔎 | 🔎 | 0.0.0.0 | 2051 | Demo-Encrypt | demo default document encryption |
| example-firewall | up | 🔎 | | primary | 2048 | deflect-inject | an example XML FirewallService |
| test | up | 🔎 | | 0.0.0.0 | 2053 | test-101 | an example XML FirewallService |

[Add]

Figure 6 - 55. Firewall catalog with probe icon

Note: The MultiStep Probe should not be left in the enabled state for production conditions. Return to the object page for the service to disable the Probe before moving the configuration into production.

The invention claimed is:

1. A computer-implemented method for processing data, in which a computer system performs operations comprising:

identifying a processing pipeline defining a series of markup language processing steps including receiving a selection of a markup language processing service for which debugging is to be enabled, the selected markup language processing service defining a respective processing pipeline of markup language processing steps;

inserting at least one debugging step into the processing pipeline, the at least one debugging step defining processing to collect debug data associated with application of the markup language processing steps to markup language data to be processed by the processing pipeline including identifying a configuration associated with the selected markup language processing service for which debugging is to be enabled;

for each markup language processing step defined in the configuration, inserting a debug step into the configuration, the debug step capturing a snapshot of debug data associated with that markup language processing step; and executing the series of markup language processing steps, including the at least one debugging step, upon input markup language data as a transaction, execution of the at least one debugging step capturing the debug data for at least one of the series of markup language processing steps in the processing pipeline, the debug data allowing analysis of operation of the markup language processing steps of the processing pipeline on the input markup language data, wherein executing the series of markup language processing steps, including the at least one debugging step, upon input markup language data as a transaction comprises:

detecting a trigger event during processing of a transaction and in response, indicating that the debug data collected from execution of the debug steps associated with the transaction is to be post-processed and not discarded.

2. The method of claim 1 wherein identifying a processing pipeline defining a markup language processing transaction as a series of markup language processing steps comprises:

rendering, via a graphical user interface, a selection of markup language processing services for which debugging can be enabled;

receiving a transaction history count identifying a number of transactions for which to collect debug data from application of the processing pipeline to input markup language data.

3. The method of claim 1 wherein inserting a debug step into the configuration comprises:

inserting a first debug step before the first step in the configuration, the first debug step, upon execution, capturing a snapshot of input data associated with the first step;

inserting a successive debug step after each successive step in the series of steps defined in the configuration other than the last step, each successive debug step, upon execution, capturing a snapshot of output data processed by the former step in the configuration, and capturing a snapshot of input data associated with the next step in the configuration; and inserting a final debug step after the last step in the configuration, the final debug step, upon execution, capturing a snapshot of output data processed by the last step in the configuration.

4. The method of claim 3 wherein executing the series of markup language processing steps, including the at least one debugging step, as a transaction upon markup language data comprises:

receiving input markup language data as a transaction;

applying the processing pipeline defining a series of markup language processing steps to the input markup language data, application of the processing pipeline including operating the first debug step, each successive debug step, and the final debug step to capture markup language specific input and output data as debug data for each step; and storing collected debug data for each step collectively as a debug record associated with the transaction for the input markup language data.

5. The method of claim 3 wherein the inserting at least one debugging step into the processing pipeline comprises:

inserting the first debug step, each successive debug step, and the final debug step into the processing pipeline in real-time, during executing the series of markup language processing steps.

6. The method of claim 3 wherein inserting at least one debugging step into the processing pipeline comprises:

inserting the first debug step, each successive debug step, and the final debug step into the configuration defining the processing pipeline prior to application and execution of any markup language processing steps in the processing pipeline upon input markup language data.

7. The method of claim 2 comprising:

receiving an identification of the trigger event that indicates a condition upon which to save debug data associated with a transaction.

8. The method of claim 7 wherein there are a plurality of debugging steps inserted into the series of markup language processing steps in the processing pipeline, each debugging step capturing markup language data constructs associated with the transaction as debug data; and wherein executing the series of markup language processing steps, including the at least one debugging step, upon input markup language data as a transaction comprises:

during execution of at least one of the debugging steps, engaging a messaging protocol to transfer at least a portion of the debug data to a control service and halting execution of the debug step and the transaction, until the control service indicates, via the messaging protocol, that the halted debug step can proceed to allow the transaction to continue processing.

9. The method of claim 8 wherein executing the series of markup language processing steps, including the at least one debugging step, upon input markup language data as a transaction comprises using the messaging protocol to transfer the debug data to an external server for post-processing; and wherein receiving a selection of a markup language processing service for which debugging is to be enabled comprises:

receiving a selection of at least one of a XSL proxy service, an XML firewall service, and an XSL coprocessor service upon which to insert debugging steps for transactions processed by the selected service.

10. The method of claim 1 wherein capturing the debug data for at least one of the series of markup language processing steps in the processing pipeline comprises:

executing a debug step between two pipeline steps to capture output of the proceeding pipeline step including:

i) an execution trace of the pipeline step indicating how that pipeline step traversed an XML programming language; and ii) information on XSLT extension functions used during processing in that pipeline step including an identify of an XSLT extension function that was called by the pipeline step, what the XSLT function inputs were, and what the XSLT extension function produced as output.

11. The method of claim 1 wherein capturing the debug data for at least one of the series of markup language processing steps in the processing pipeline comprises:

executing a debug step to capture pipeline step context including at least one of: at least a part of an XML document, portions of a parsed XML tree, a binary data block, an attachment to the input markup language data, stylesheet parameters, user defined global and local variables user defined for use by the pipeline, service intrinsic data comprising system variables, client and peer identities, URL information, TCP/IP port numbers and other protocol specific data.

12. A computerized device comprising:

a memory;

a processor;

an interconnection mechanism coupling the memory and the processor;

the memory encoded with a markup application and debug process for processing markup language data, that when executed on the processor, produces a debug process that causes the computer system to perform operations of:

identifying, in the memory, a processing pipeline defining a series of markup language processing steps including receiving a selection of a markup language processing service for which debugging is to be enabled, the selected markup language processing service defining a respective processing pipeline of markup language processing steps;

inserting at least one debugging step into the processing pipeline, the at least one debugging step defining processing to collect debug data associated with application of the markup language processing steps to markup language data to be processed by the processing pipeline including identifying a configuration associated with the selected markup language processing service for which debugging is to be enabled; and for each markup language processing step defined in the configuration, inserting a debug step into the configuration, the debug step capturing a snapshot of debug data associated with that markup language processing step; and executing, on the processor, the series of markup language processing steps, including the at least one debugging step, upon input markup language data as a transaction, execution of the at least one debugging step capturing the debug data for at least one of the series of markup language processing steps in the processing pipeline, the debug data allowing analysis of operation of the markup language processing steps of the processing pipeline on the input markup language data, wherein upon the computer system performing the operation of executing the series of markup language processing steps, including the at least one debugging step, upon input markup language data as a transaction the computer system performs the operation of:

detecting a trigger event during processing of a transaction and in response, indicating that the debug data collected from execution of the debug steps associated with the transaction is to be post-processed and not discarded.

13. The computerized device of claim 12 wherein the computer system further comprises a display coupled to the interconnection mechanism, and wherein upon the computer system performing the operation of identifying a processing pipeline defining a markup language processing transaction as a series of markup language processing steps, the computer system performs the operations of:

rendering, via a graphical user interface on the display, a selection of markup language processing services for which debugging can be enabled; and receiving a transaction history count identifying a number of transactions for which to collect debug data from application of the processing pipeline to input markup language data.

14. The computerized device of claim 12 wherein upon the computer system performing the operation of inserting a debug step into the configuration, the computer system performs the operations of:

inserting a first debug step before the first step in the configuration, the first debug step, upon execution, capturing a snapshot of input data associated with the first step;

inserting a successive debug step after each successive step in the series of steps defined in the configuration other than the last step, each successive debug step, upon execution, capturing a snapshot of output data processed by the former step in the configuration, and capturing a snapshot of input data associated with the next step in the configuration; and inserting a final debug step after the last step in the configuration, the final debug step, upon execution, capturing a snapshot of output data processed by the last step in the configuration.

15. The computerized device of claim 14 wherein upon the computer system performing the operation of executing the series of markup language processing steps, including the at least one debugging step, as a transaction upon markup language data, the computer system performs the operations of:

receiving input markup language data as a transaction;

applying the processing pipeline defining a series of markup language processing steps to the input markup language data, application of the processing pipeline including operating the first debug step, each successive debug step, and the final debug step to capture markup language specific input and output data as debug data for each step; and storing collected debug data for each step collectively as a debug record associated with the transaction for the input markup language data.

16. The computerized device of claim 14 wherein upon the computer system performing the operation of the inserting at least one debugging step into the processing pipeline, the computer system performs the operation of:

inserting the first debug step, each successive debug step, and the final debug step into the processing pipeline in real-time, during executing the series of markup language processing steps.

17. The computerized device of claim 14 wherein upon the computer system performing the operation of inserting at least one debugging step into the processing pipeline, the computer system performs the operation of:

inserting the first debug step, each successive debug step, and the final debug step into the configuration defining the processing pipeline prior to application and execution of any markup language processing steps in the processing pipeline upon input markup language data.

18. The computerized device of claim 13 wherein the computer system performs the operations of:
receiving an identification of the trigger event that indicates a condition upon which to save debug data associated with a transaction.

19. The computerized device of claim 18 wherein there are a plurality of debugging steps inserted into the series of markup language processing steps in the processing pipeline, each debugging step capturing markup language data constructs associated with the transaction as debug data;
and wherein upon the computer system performing the operation of executing the series of markup language processing steps, including the at least one debugging step, upon input markup language data as a transaction, the computer system performs the operations of:
during execution of at least one of the debugging steps, engaging a messaging protocol to transfer at least a portion of the debug data to a control service and halting execution of the debug step and the transaction, until the control service indicates, via the messaging protocol, that the halted debug step can proceed to allow the transaction to continue processing.

20. The computerized device of claim 19 wherein upon the computer system performing the operation of executing the series of markup language processing steps, including the at least one debugging step, upon input markup language data as a transaction, the computer system performs the operation of
using the messaging protocol to transfer the debug data to an external server for post-processing; and
wherein receiving a selection of a markup language processing service for which debugging is to be enabled comprises:
receiving a selection of at least one of a XSL proxy service, an XML firewall service, and an XSL coprocessor service upon which to insert debugging steps for transactions processed by the selected service.

21. The computerized device of claim 12 wherein upon the computer system performing the operation of capturing the debug data for at least one of the series of markup language processing steps in the processing pipeline, the computer system performs the operation of:
executing a debug step between two pipeline steps to capture output of the proceeding pipeline step including:
i) an execution trace of the pipeline step indicating how that pipeline step traversed an XML programming language;
ii) information on XSLT extension functions used during processing in that pipeline step including an identify of an XSLT extension function that was called by the pipeline step, what the XSLT function inputs were, and what the XSLT extension function produced as output.

22. The computerized device of claim 12 wherein upon the computer system performing the operation of capturing the debug data for at least one of the series of markup language processing steps in the processing pipeline, the computer system performs the operation of:
executing a debug step to capture pipeline step context including at least one of: at least a part of an XML document, portions of a parsed XML tree, a binary data block, an attachment to the input markup language data, stylesheet parameters, user defined global and local variables user defined for use by the pipeline, service intrinsic data comprising system variables, client and peer identities, URL information, TCP/IP port numbers and other protocol specific data.

23. A computer readable storage medium including computer program logic encoded thereon that represents an application including a debug process, that, upon execution in a computer system, causes the computer system to process data by performing the operations of:
identifying a processing pipeline defining a series of markup language processing steps including receiving a selection of a markup language processing service for which debugging is to be enabled, the selected markup language processing service defining a respective processing pipeline of markup language processing steps;
inserting at least one debugging step into the processing pipeline, the at least one debugging step defining processing to collect debug data associated with application of the markup language processing steps to markup language data to be processed by the processing pipeline including identifying a configuration associated with the selected markup language processing service for which debugging is to be enabled;
for each markup language processing step defined in the configuration, inserting a debug step into the configuration, the debug step capturing a snapshot of debug data associated with that markup language processing step; and
executing the series of markup language processing steps, including the at least one debugging step, upon input markup language data as a transaction, execution of the at least one debugging step capturing the debug data for at least one of the series of markup language processing steps in the processing pipeline, the debug data allowing analysis of operation of the markup language processing steps of the processing pipeline on the input markup language data, wherein executing the series of markup language processing steps, including the at least one debugging step, upon input markup language data as a transaction comprises:
detecting a trigger event during processing of a transaction and in response, indicating that the debug data collected from execution of the debug steps associated with the transaction is to be post-processed and not discarded.

* * * * *